(12) United States Patent
Kotlarski

(10) Patent No.: US 6,810,556 B1
(45) Date of Patent: Nov. 2, 2004

(54) WIPER BLADES HAVING DIFFERENT SIZES FOR AUTOMOBILE GLASS PANELS

(75) Inventor: Thomas Kotlarski, Bad Neuenahr (DE)

(73) Assignee: Robert Bosch GmbH, Stuttgart (DE)

( * ) Notice: Subject to any disclaimer, the term of this patent is extended or adjusted under 35 U.S.C. 154(b) by 55 days.

(21) Appl. No.: 10/088,221

(22) PCT Filed: Aug. 30, 2000

(86) PCT No.: PCT/DE00/02953

§ 371 (c)(1),
(2), (4) Date: Mar. 18, 2002

(87) PCT Pub. No.: WO01/23232

PCT Pub. Date: Apr. 5, 2001

(30) Foreign Application Priority Data

Sep. 24, 1999 (DE) .......................................... 199 45 858

(51) Int. Cl.$^7$ ................................................. B60S 1/38
(52) U.S. Cl. ................................ 15/250.43; 15/250.451
(58) Field of Search ......................... 15/250.43, 250.44, 15/250.451, 250.452, 250.453, 250.454, 250.48, 250.361

(56) References Cited

U.S. PATENT DOCUMENTS 2,750,617 A * 6/1956 Oishei ................... 15/250.452
3,192,551 A * 7/1965 Appel ...................... 15/250.43
3,696,497 A * 10/1972 Quinlan et al. ................ 29/592
5,361,896 A    11/1994 Yang ........................... 206/223
5,493,750 A *  2/1996 Bollen et al. ........... 15/250.452

FOREIGN PATENT DOCUMENTS

| DE | 12 43 998 B | 7/1967 | |
| DE | 197 29 865 A | 1/1999 | |
| DE | 198 02 451 A | 7/1999 | |
| GB | 862036 * | 3/1961 | ............ 15/250.451 |
| GB | 1 565 955 A | 4/1980 | |

* cited by examiner

Primary Examiner—Gary K. Graham
(74) Attorney, Agent, or Firm—Michael J. Striker

(57) ABSTRACT

The invention relates to wiper blades of various dimensions for windows of motor vehicles, with band-like, elongated, spring-elastic support elements (14), each for a respective wiper strip (22), which is associated with each wiper blade (10), can be placed against the window (12), and is disposed on the lower band surface (21) oriented toward the window, where in a longitudinal midsection of each support element, the upper band surface (15) oriented away from the window supports a wiper blade half (16) of a connecting device (18). In order to supply wiper blades of different dimensions with a single type of such a connecting device half and to thereby reduce the costs for the wiper blades, the widths (36) of the support elements in this longitudinal midsection are the same size independent of the other dimensions of these support elements.

2 Claims, 4 Drawing Sheets

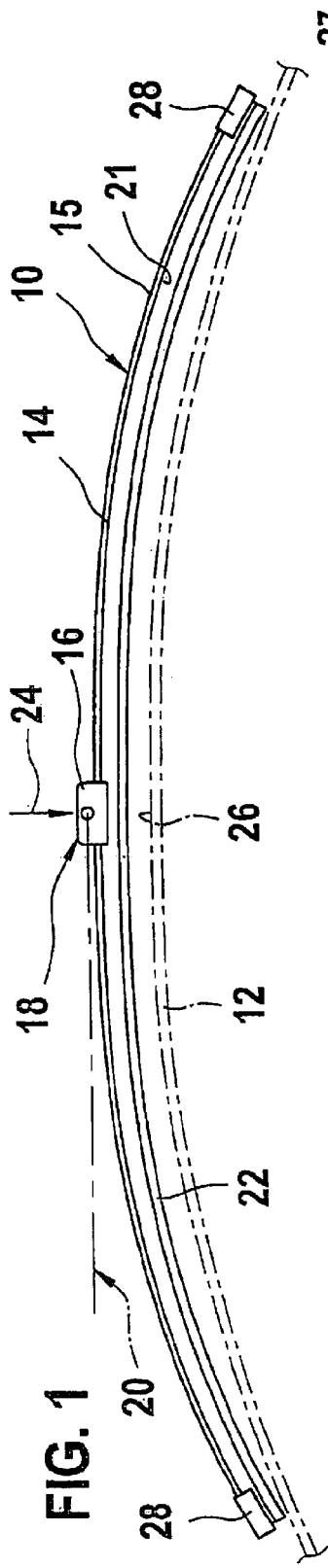
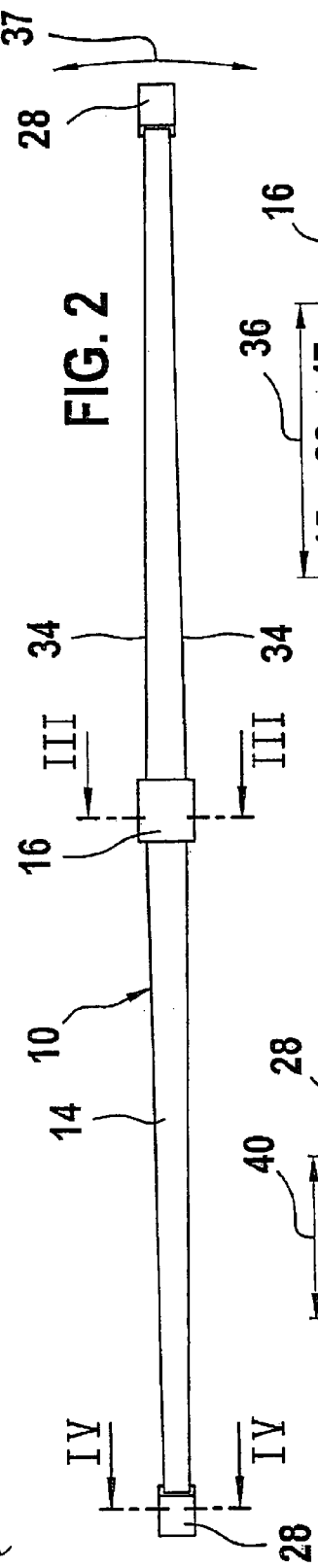
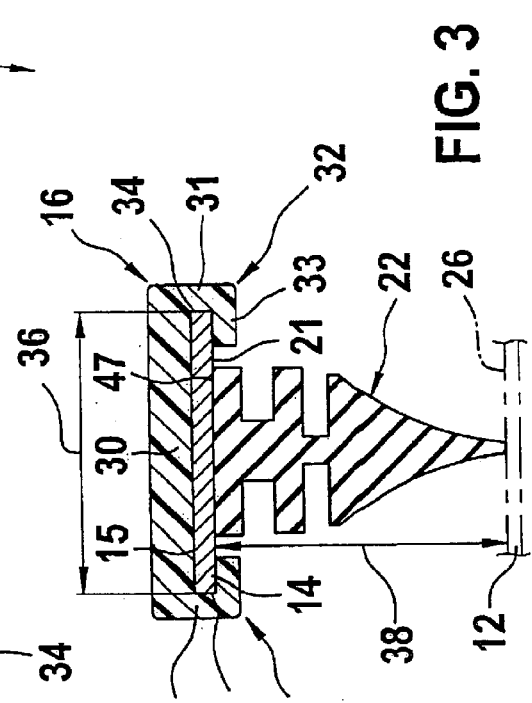
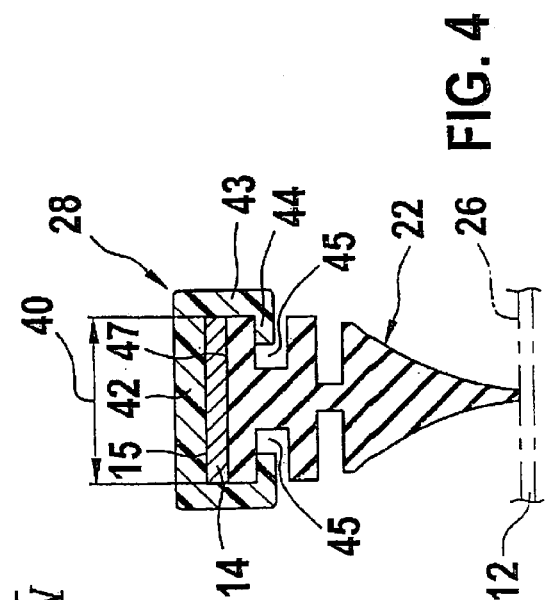

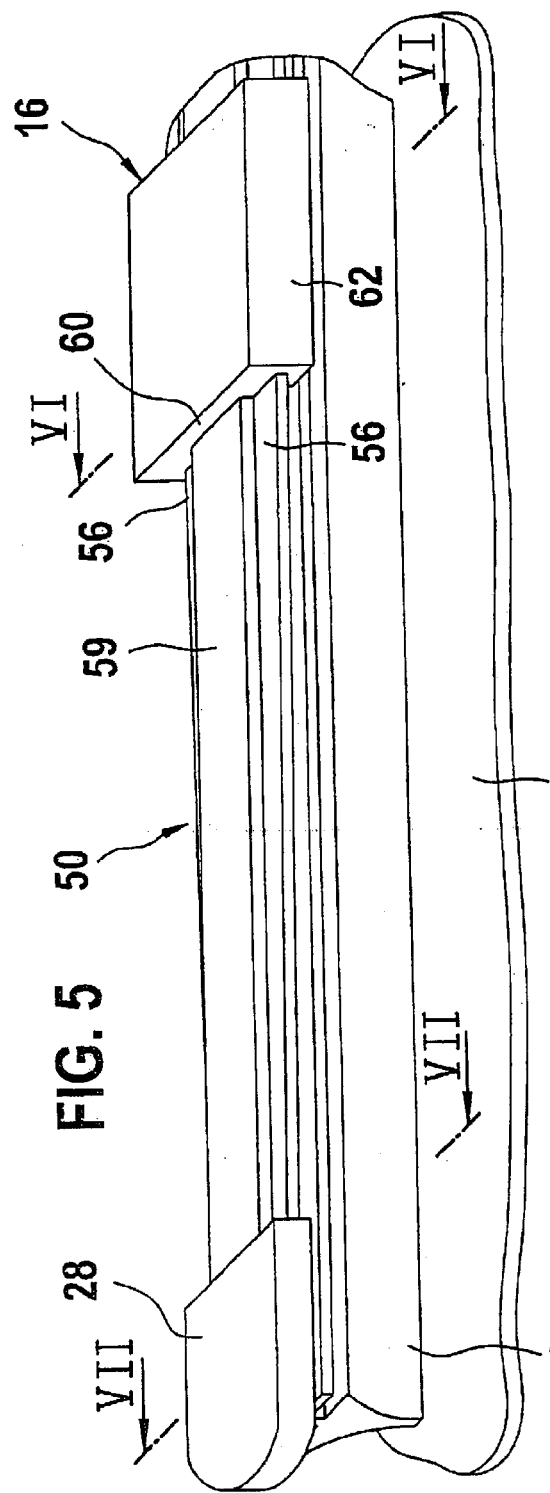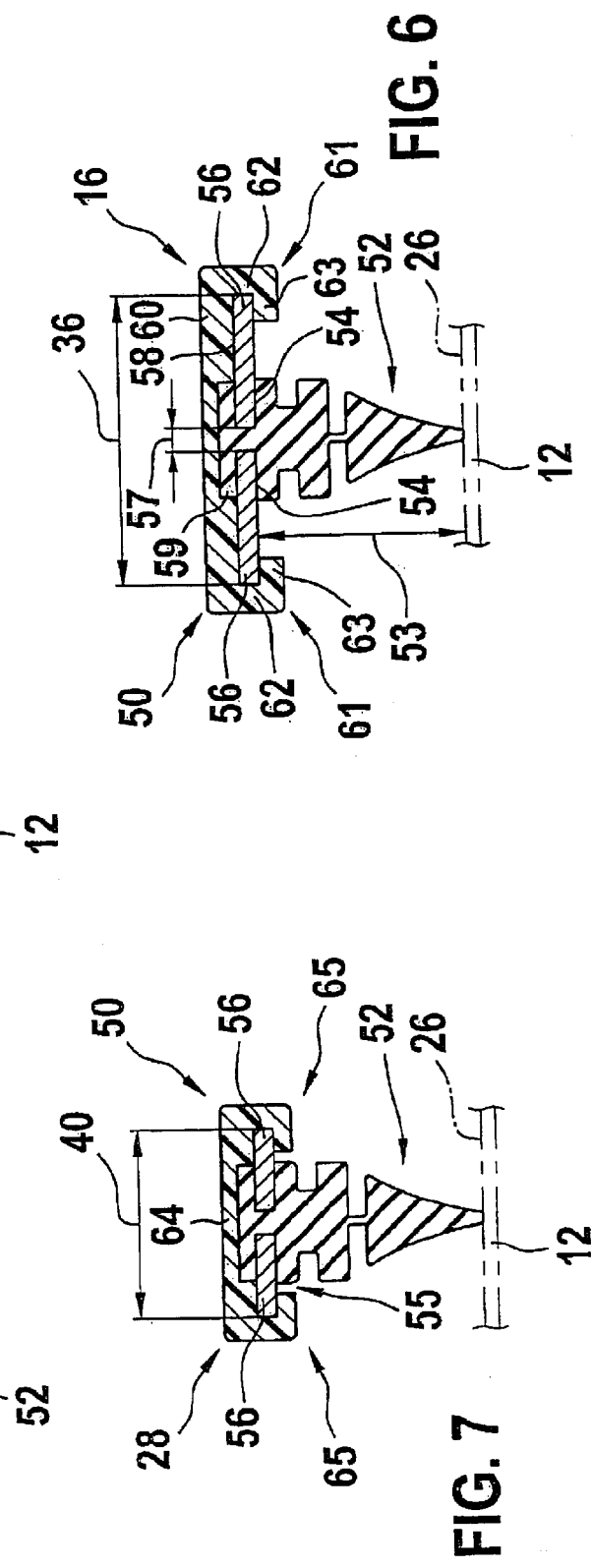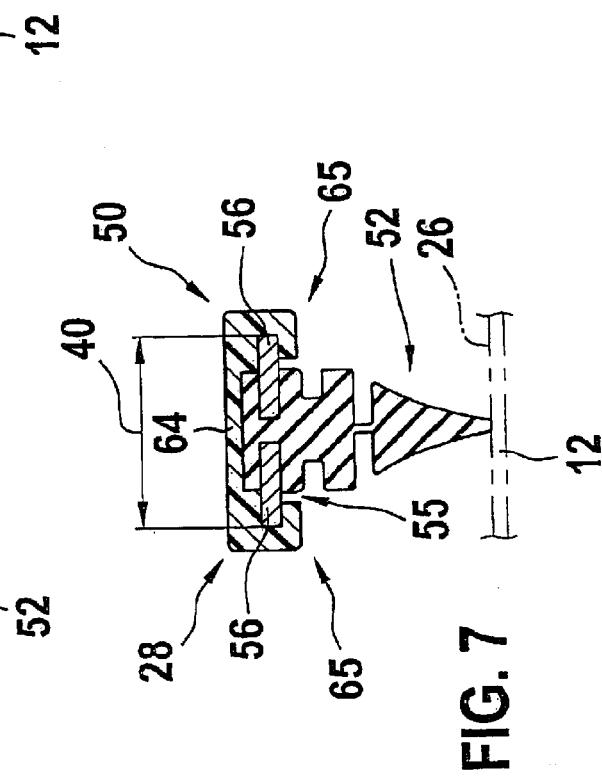

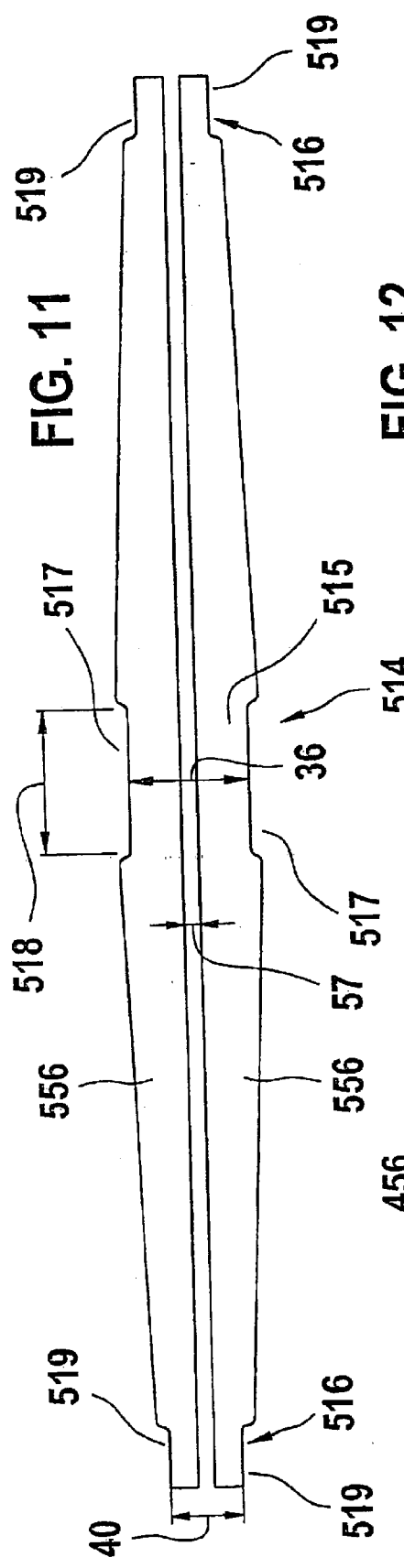
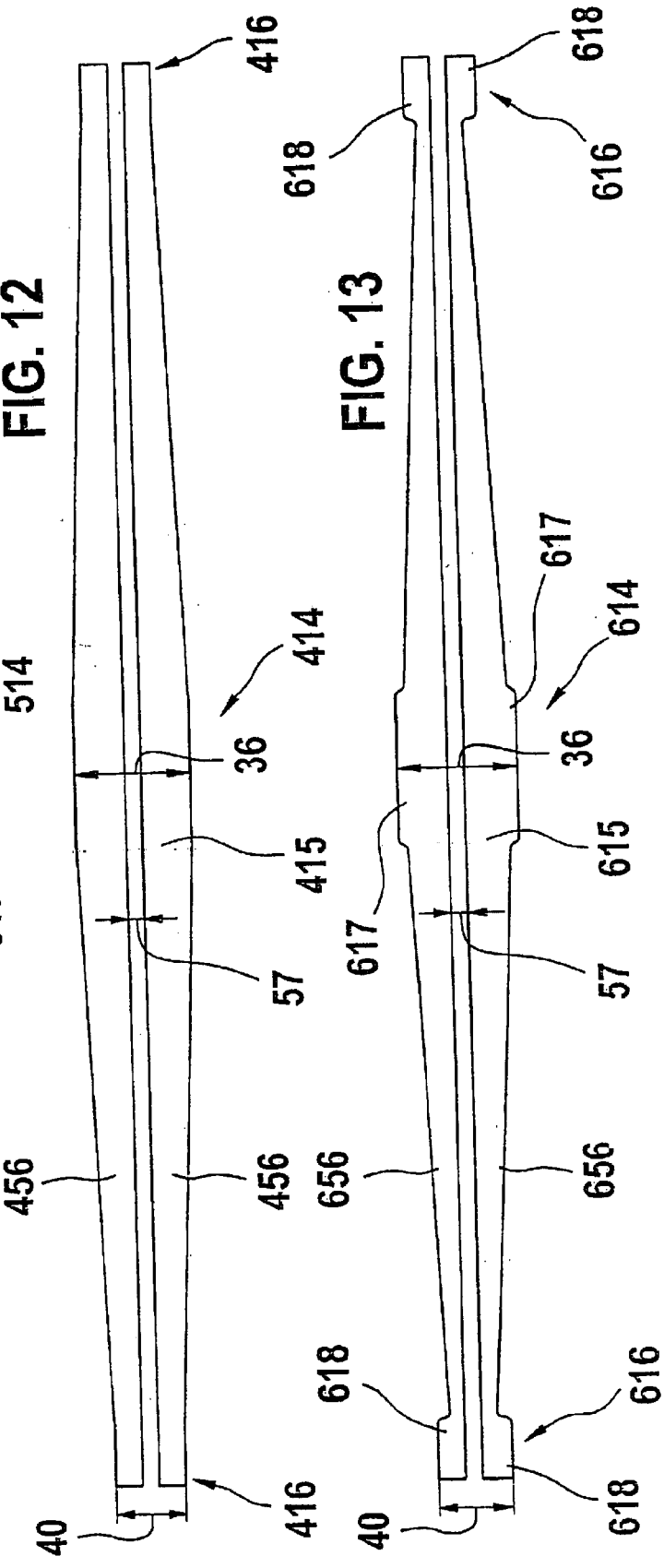

WIPER BLADES HAVING DIFFERENT SIZES FOR AUTOMOBILE GLASS PANELS

BACKGROUND OF THE INVENTION

In the design of wiper blades, a multitude of criteria predetermined by lawmakers and vehicle manufacturers must be taken into account, e.g. the window region to be wiped by the wiper blades, window size, window curvature, contact pressure of the wiper blades against the window, course of air flow in front of the window, etc. For obvious reasons, this results in the fact that specific support elements for the wiper strips resting against the window are required for practically every vehicle type and even for the wiper blade on the driver's side versus the one on the passenger side. These support elements must then be provided with the wiper blade half of a connecting device by means of which the wiper blade can be connected to the wiper arm, which is equipped with the other half of the connecting device.

In this context, the effort to comply with specifications predetermined by the vehicle manufacturer has yielded support elements that vary particularly in terms of their different lengths and widths. In addition, in support elements of this kind, for example their width can also vary over their length, where the cross section of the support element or its width tapers starting from the seat position of the connecting device half. In known wiper blades of this type, DE 19729865.6 A1), the device half engages the support element on its outer longitudinal edges with hook-like projections so that it is affixed to the support element. However, since for the above-mentioned reasons, the maximal width of the support element differs from case to case, for each of these cases, a particular device half, which is adapted to the width of the support element, must be kept on hand, even if the variations in width are relatively slight. This is because the device half must always, even during wiping operation, be connected to the support element so that it does not move lateral to the longitudinal direction of the wiper blade because of the other wiper blade half of the connecting device.

This requirement causes a multitude of device halves to be required since as a rule, each of these halves can be used for only one wiper blade of a single vehicle type.

Comparable problems arise in the two end sections of the support elements, to which cap-like holders must be attached. These caps are intended, for example, to reduce the risk of injury presented by the end edges of the support elements during handling of the wiper blades, for example when replacing them. In known wiper blades of this type (DE 19802451.7 A1), these caps can also aid in the connection between the wiper strip and the support element if they engage the support element, for example with claws, and hold the wiper strip. It is also true of these caps and for their seat positions on the support elements that for the reasons mentioned above, the width of the support elements at their ends varies in size from case to case. Therefore, correspondingly adapted caps must also be produced for each different use, which starting with the manufacturing apparatuses for these caps, down to the storage and the danger of mixing them up during installation, is very cost-intensive.

SUMMARY OF THE INVENTION

With the wiper blade according to the invention, by standardizing the width of the support elements in the above-mentioned longitudinal midsection, at least several support element types can be provided with the same device halves so that the manufacturing costs for these halves are reduced and the storage of them is simplified.

Since the wiper blade half of the connecting device embraces the two remote outer longitudinal edges of each support element in a form-fitting manner with longitudinal shoulders, the immobility of the connection between the halves of the connecting device and the support element is further improved.

The multitude of caps can be fundamentally reduced and consequently, the costs for the wiper blade can be considerably reduced.

The above-described features have no influence on the support element design because both in the longitudinal midsection and in the end sections of the support elements, they are continuously stiffened by the add-on pieces positioned there, which already has to be approximately taken into consideration in their dimensioning.

A proper fit of the caps on the support element ends is achieved if the caps embrace the two remote outer longitudinal edges of each of the support element in a form-fitting manner with longitudinal shoulders.

In certain application instances, it is advantageous if the support elements are embodied as one-piece bands, which have the same width in the vicinity of the seat position of the device halves.

With a width of the support elements that exceeds a particular fit measurement in its effective spring regions, it is useful if the width of the seat position is constituted by a partial, lateral constriction of the support element.

However if the support element design falls below the width fit measurement predetermined for the support element, then the width of the seat position can be simply constituted by a partial, lateral widening of the support element.

If the length of the constriction is matched to the length of the wiper blade device half, then an exactly determined seat position for the device half is achieved without having to carry out other measures.

For certain application instances, it is advantageous if the support elements are embodied as one-piece bands, which have the same width in the vicinity of the seat position of the cap.

In order to adapt the fit measurement of the support element width in the vicinity of the seat positions of the caps, the fit measurement can be maintained as a function of the respective width determined by the support element design by virtue of the fact that the width of the seat position for the caps is determined by a partial lateral constriction of the support element or the width of the seat position for the caps is determined by a partial lateral widening of the support element.

The embodiment of the support elements by means of two spring strips, which are disposed parallel to and spaced apart from each other, can in many application instances represent an advantageous alternative to the one-piece support elements.

In this connection, these spring strips that comprise a single support element can be disposed in longitudinal grooves in the wiper strip, which are disposed in a common plane spaced apart from the window and whose bases are spaced apart from each other.

Other advantageous improvements and embodiments of the invention are disclosed in the following description of exemplary embodiments shown in the accompanying drawings.

BRIEF DESCRIPTION OF THE DRAWINGS

FIG. 1 shows a side view of a wiper blade according to a first embodiment of the invention, FIG. 2 shows a top view of the wiper blade according to FIG. 1, enlarged and rotated by 90°, FIG. 3 shows the sectional plane of a section through the wiper blade along the line III—III in FIG. 2, enlarged and rotated by 90°, FIG. 4 shows the sectional plane of a section through the wiper blade along the line IV—IV in FIG. 2, enlarged and rotated by 90°, FIG. 5 shows a perspective, partial view of a differently embodied wiper blade according to the invention, FIG. 6 shows the sectional plane of a section through the wiper blade according to FIG. 5, along the line VI—VI, rotated correspondingly, FIG. 7 shows the sectional plane of a section through the wiper blade according to FIG. 5, along the line VII—VII, rotated correspondingly.

DETAILED DESCRIPTION OF THE PREFERRED EMBODIMENTS

Figure 8:
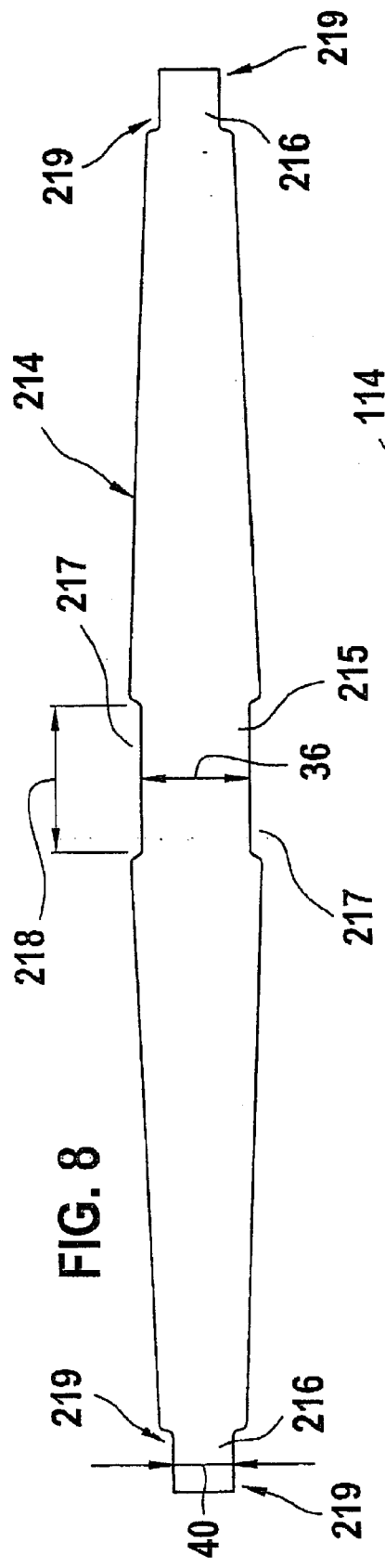
FIGS. 8 to 10 show top views of differently designed support elements, which belong to the wiper blade according to FIGS. 1 to 4, and FIGS. 11 to 13 show top views of differently designed support elements, which belong to the wiper blade according to FIGS. 8 to 10.

A wiper blade 10 for windows 12 of motor vehicles shown in FIGS. 1 and 2 has an elongated spring-elastic support element 14. On the top side 15 of the support element 14 oriented away from the window 12 to be wiped, the wiper blade half 16 of a connecting device 18 is disposed, with the aid of which the wiper blade 10 can be detachably connected to a driven wiper arm 20, which is indicated with dot-and-dash lines in FIG. 1 and is guided on the body of a motor vehicle. On the underside 21 of the support element 14 oriented toward the window 12, an elongated rubber-elastic wiper strip 22 is disposed with its longitudinal axis parallel to the support element. The wiper arm 20 and therefore also the wiper blade 10 are loaded in the direction of an arrow 24 toward the window to be wiped, whose surface to be wiped is indicated in FIG. 1 by a dot-and-dash line 26. Since the dot-and-dash line 26 is intended to represent the sharpest curvature of the window surface, it is clear that the curvature of the unloaded wiper blade 10, with its two ends resting against the window 12, is sharper than the maximal window curvature. With the contact pressure (arrow 24), the wiper blade 10 rests with its wiper strip 22 against the window surface 26 over its entire length. As a result, a tension is built up in the band-like spring-elastic support element 24, which assures a proper contact of the wiper strip 22 against the motor vehicle window 12 over its entire length. FIGS. 1 and 2 also shown that a cap 28 is respectively disposed at the two ends of the wiper blade 10 and the function of this cap will be discussed in more detail below.

The specific design of a first embodiment of the wiper blade according to the invention will be explained in detail below. As shown by the section through the wiper blade in FIG. 3, the wiper blade half 16 of the connecting device 18 has a plate-like base 30, which is provided with coupling means, not shown in detail, for the free end of the wiper arm 20. The base plate 30 has L-shaped projections 32 on its longitudinal sides, with which their one L-legs 31, embrace the remote outer longitudinal edges 34 of the support element 14 and with their other L-legs 33, engage under the support element 14 and rest against the underside 21 of the support element 14. The distance 36 between the two insides of the one L-legs 31 oriented toward each other corresponds to a fit measurement, which the support clement 14 has where the half 16 is positioned.

In the two exemplary embodiments of the invention given here, this seat position of the half 16 is shown in the longitudinal midsection of the wiper blade and the support element 14. The term "longitudinal midsection", however, does prevent this seat position from also being located close to one of the two end sections of the wiper blade and the support element or even from coinciding with one of the two end sections of the support element so that the half 16 also performs one of the functions of the caps 28.

In the exemplary embodiment according to FIGS. 1 to 4, the support element is embodied as a one-piece band. In the vicinity of the seat position of the device half 16, the two longitudinal edges 34 extend essentially parallel to each other, thus producing a fit measurement 36 that is constant over the entire seat position for the half 16. Since the distance between the two L-legs 31—which, considered in and of themselves, can be also be referred to as longitudinal shoulders that cooperate with the longitudinal edges 34—are spaced apart at a distance 36, which corresponds to the fit measurement, this produces a favorably snug fit between the support element 14 and the half 16 in terms of the working direction of the wiper blade 10 (double arrow 37 in FIG. 2). FIG. 3 also shows that the support element 14 of the wiper blade 10 is disposed at a distance 38 from the window 12 to be wiped when the wiper blade 10 with its wiper strip 22 assumes its operating position in relation to the window 12. Finally, FIG. 2 also shows that the width of the support element 14, starting from the seat position for the half 16, tapers towards its two ends. This can also be seen by comparing the fit measurement 36 for the seat position of the half 16 to a second fit measurement 40 for the caps 28 (FIG. 4). The caps 28 have an essentially U-shaped cross-section, whose U-base 42—just like the base plate 30 of the half 16—rests against the top side 15 of the support element 14 oriented away from the window 12. The two U-legs 43 of the caps 28 are spaced apart from each other by a distance that corresponds to the fit measurement 40. At the free ends of the U-legs 43, the caps are provided with claws 44 oriented toward each other, which engage in longitudinal grooves 45 of the wiper strip 22. In the exemplary embodiment, the end surface 47 of the wiper strip 22 oriented away from the window 12 is connected to the underside 21 of the support element 14 by means of a glued connection. Since the glued connection is subjected to a high, constant, alternating stress during wiper operation, the caps disposed at the ends of the support element 14 contribute significantly to the securing of the glued connection between the wiper strip 22 and the support element 14 when they engage with their claws in the wiper strip.

As explained at the beginning, since the wiper blades of the entire array of wiper blades offered by the manufacturer must have different dimensions, an essential factor of the invention will be discussed in detail below for the above-explained exemplary embodiment of a wiper blade, in conjunction with FIGS. 8 to 10. It should be noted that the support elements 114 (FIG. 9), 214 (FIG. 8), and 314 (FIG. 10) depicted in these figures are not shown to scale, particularly in the longitudinal direction, and therefore can in no way be taken for working drawings. Assuming that the support element 114 shown in FIG. 9 corresponds in its contour to the support element 14 in FIG. 2, then this is preferably conceived for midsized wiper blades. It has a fit measurement 36 in the vicinity of the seat position 115 for the half 16 of the connecting device 18. At its two end sections 116, which represent the seat positions for the two caps 28, the width of the support element 114 corresponds to the fit measurement 40.

Figure 9:
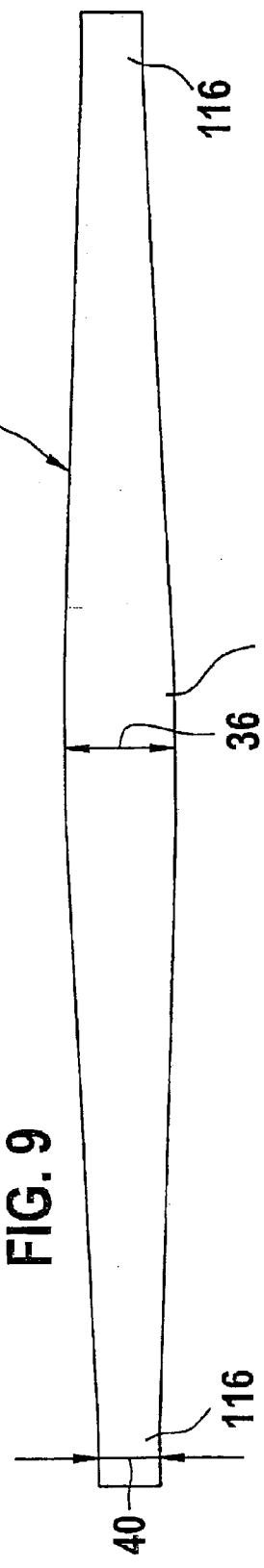

The embodiment of the support element 214 shown in FIG. 8 is as a rule conceived for wiper blades that are wider and longer than the wiper blades that are used with the support element 114 (FIG. 9). Therefore, the support element 214 is wider in its two regions between the seat position 215 for the half 16 and the two seat positions 216 for the caps 28 than it is in the corresponding regions of the support element 114 (FIG. 9). So that the same halves 16 can be used with this support element 214 as with the support element 115, this support element 214 is provided with opposing constrictions 217 on its two longitudinal sides in the vicinity of the seat position 215, whose lengths 218 are matched to the length of the half 16. The depth of the constrictions 217 is dimensioned to produce the fit measurement 36 in the vicinity of the seat position 215. A corresponding embodiment is provided at both ends of the support element 214. Constrictions 219 of the support element 214 are also provided at these two ends to produce a width there in the vicinity of the seat positions 216 of the caps 28, which corresponds to the fit measurement 40 so that wiper blades with a support element 214 according to FIG. 8 can use not only the halves 16 but also the caps 28 that are also used in wiper blades with a support element according to FIG. 9.

Figure 10:
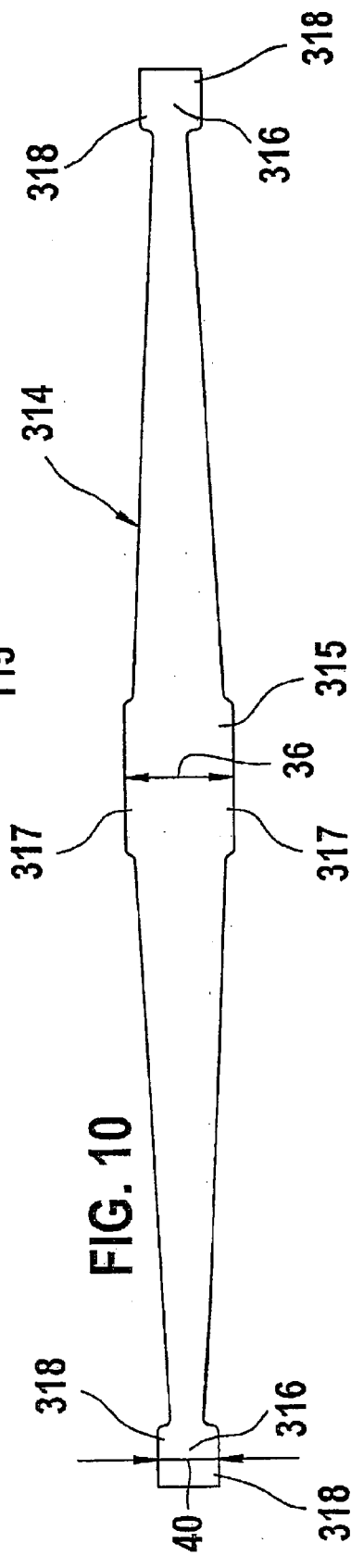

Considering the explanations made of the beginning, the support element 314 according to FIG. 10 is preferably conceived for wiper blades that are smaller than the wiper blades in which the support elements 114 and 214 according to FIGS. 9 and 8 are used. However, so that the same halves 16 that are used with the support elements 114 and 214 can be used here, this support element 314 is provided with partial lateral widenings 317 on its two longitudinal sides in the vicinity of the seat position 315 for the half 16. The widenings 317 on both sides of the support element 314 in the vicinity of the seat position 315 of the half 16 are dimensioned to produce a width of the support element 314 there, whose size coincides with the fit measurement 36. It is thus possible to use the same halves 16 of the connecting device 18 for this support element 314 as for the support elements 114 and 214. In addition, the two end regions of the support element 314, which comprise the seat position 316 for the holders 28, likewise have widenings 318 disposed opposite each other, which are dimensioned to produce a fit measurement in the vicinity of the seat positions 316 for the caps 28, which corresponds to the fit measurement 40 according to FIG. 4. It is thus possible in wiper blades with support elements 314 according to FIG. 10 to also use the same caps 28 that are used with the elements 114 and 214.

As shown in FIGS. 5 to 7, another embodiment of the wiper blade 50 according to the invention has a support element 55, which is divided in its longitudinal direction and consequently includes two spring strips 56. This wiper blade 50 has a wiper strip 52, which, at a distance 53 from the window 12, is provided with lateral, opposing longitudinal grooves 54, which serve to contain the two spring strips 56 comprising the support element 55. In the exemplary embodiment, the two spring strips 56 are disposed in a common plane, but this is not absolutely necessary. The bases of the two longitudinal grooves 54 are spaced apart from each other by a distance 57 (FIG. 6). The width of the two spring strips 56 is dimensioned so that they protrude with edge regions from the longitudinal grooves 54 containing them. This is particularly important where the seat positions must be provided for the half 16 of the connecting device 18 and the caps 28. Since the wiper strip 52 in this exemplary embodiment has a top strip 59 disposed on the top side 58 of the support element 55, the half 16 must be provided with a corresponding receiving groove for the top strip 59. In this embodiment as well, on the longitudinal sides of a base plate 60 of the half 16, L-shaped projections 61 are provided, where the L-legs 62 cross the plane of the spring strips 56 and the other L-legs 63 engage under the support element 55 or its spring strips 56. The distance between the opposing L-legs 62 corresponds to a fit measurement 36, which is composed of the width of the spring strips 56 in the vicinity of the seat position for the cap 28 plus the measurement 57 between the two bases of the longitudinal grooves 54 (FIG. 6). In this embodiment (FIG. 7), the caps have a design that corresponds to the design of the half 16 according to FIG. 6. The longitudinal sides of a cap base plate 64 are adjoined by claw-like projections 65, which engage under the respective spring strip 56. The distance between the two claws 65 in the vicinity of the spring strips 56 is dimensioned to produce a fit measurement 40, which is composed of the width of the two springs 56 in the vicinity of the two ends of the support element 55 plus the measurement 57 between the two bases of the longitudinal grooves 54 that are spaced apart from each other. The fit measurement 40 is smaller than the fit measurement 36 because the two spring strips 56, starting from the seat position for the half 16, taper toward the seat positions for the caps 28. Since the wiper strip 52 is normally produced by means of the extrusion process, its cross sections are identical in the vicinity of the seat position for the half and also in the vicinities of the seat positions of the caps. Consequently, the cap 28 must also be provided with a receiving groove for the top strip 59.

FIGS. 11 to 13 showed different embodiments of the support element 55. The support element according to FIG. 12 is labeled with the reference numeral 414. The embodiment of the support element according to FIG. 11 has the reference numeral 514. FIG. 13 shows another embodiment of the support element, which is labeled with the reference numeral 614. The support element 414 according to FIG. 12 has two spring strips 456, which are disposed parallel to each other and spaced apart from each other by a distance that corresponds to the distance 57 (FIG. 6) between the two bases of the longitudinal grooves 54 in the wiper strip 52. This also applies for the spring strips 556 and 656 in the embodiments of the support elements 514 and 614 shown in FIGS. 11 and 13. Apart from the longitudinal division of the support element in the exemplary embodiments according to FIGS. 11 to 13, everything said about the embodiments according to FIGS. 8 to 10 (support elements 114, 214, and 314) applies to the embodiments here. Thus, in the vicinity of the seat position 415 for the half 16 of the connecting device 18, the support element 414 has a width that corresponds to the fit measurement 36. In addition, the width of the spring strips in the vicinity of the seat positions 416 for the caps 28 is dimensioned to produce a fit measurement 40.

So that the wider support element 514 according to FIG. 11, in the vicinity of the seat position 515 for the half 16, can be matched to the fit measurement 36, constrictions 517 are likewise provided in this vicinity on each of the spring strips 556, which correspond to the constrictions 217 according to the support element 214 (FIG. 8). In this instance as well, the length of the constrictions 517 is matched to the length of the half 16. The same is also true for the disposition and design of the two ends of the support element 514 in the vicinity of the seat positions 516 for the caps 28. Here, too, the corresponding constrictions 519 are provided, which are dimensioned in order to produce a fit measurement 40. In the embodiments according to FIGS. 11 to 13, both the caps 28 and the half 16 assure a proper securing of the spring strips in the longitudinal grooves 54 of the wiper strip 52.

With the exception of the longitudinal division of the spring strips 656 and the associated distance 57 between them, the embodiment of the support element according to FIG. 13 corresponds to the embodiment of the support element 314, which is shown in FIG. 10. In the vicinity of the seat position 615 for the half 16, each spring strip has an outwardly directed widening 617 so that a fit measurement 36 is also provided in this narrow support element 614. The same goes for the embodiment of the two ends of the support element 614. Corresponding widenings 618 are also provided there so that a fit measurement 40 is produced in the vicinity of the seat positions for the holders 28. In the embodiments according to FIGS. 11 to 13, both the caps 28 and the half 16 assure a proper securing of the spring strips in the longitudinal grooves 54 of the wiper strip 52.

As explained above and also shown in the drawings, it goes without saying that with all longitudinally divided support elements 414, 514, 614, the distance 57 must be taken into consideration in the dimensioning of the fit measurement 36 and 40. It is consequently clear that for both of the described embodiments according to FIGS. 1 to 4 and 8 to 10, as well as FIGS. 5 to 7 and 11 to 13, through a corresponding embodiment of the support elements 114, 214, 314, and 414, 514, 614, the same halves 16 of the connecting device 18 and the same holders 28 can be used, even if the wiper blades have different dimensions, particularly in length and width. This is possible because the widths of all of the support elements in the vicinity of these seat positions for the halves and caps is the same size, independent of the other dimensions of these support elements and of the wiper blades. It is therefore possible to operate a wide variety of wiper blades of different dimensions with a single type of connecting device halves and caps.

What is claimed is:

1. A wiper blade for windows of motor vehicles, comprising a band-like, elongated, spring-elastic support element curved over a longitudinal extension of the support element, wherein the support element is defined by two ends and has two band surfaces, wherein on one of the band surfaces, a wiper strip that can be placed on the windshield is arranged, whereby a half of a connection device on a side of the wiper blade is disposed directly on the other band surface in a longitudinal midsection of the support element, and wherein ends of the support are covered with caps, wherein the support element has seat positions for the connection device and for the caps, wherein the connection device and the caps have a U-shaped cross section with U-legs in the region of the seat positions, and wherein with the U-legs, the seat positions fittingly overlaps, and wherein on free ends of the U-legs, opposed claws are formed, wherein said claws under-engage the support element, wherein the width of the seat position for the half of the connection device is constituted by a partial lateral widening of the support element.

2. A wiper blade according to claim 1 wherein the length of the lateral widening is matched to the length of the wiper blade device half.

* * * * *